United States Patent [19]

Tsuchiya et al.

[11] Patent Number: 5,580,936
[45] Date of Patent: Dec. 3, 1996

[54] METHOD FOR PREPARING PARTIALLY TERT-BUTOXYLATED POLY(P-HYDROXYSTYRENE)

[75] Inventors: Junji Tsuchiya; Katsuya Takemura; Osamu Watanabe; Yoshihumi Takeda; Toshinobu Ishihara, all of Nakakubiki-gun, Japan

[73] Assignee: Shin-Etsu Chemical Co., Ltd., Tokyo, Japan

[21] Appl. No.: 536,119

[22] Filed: Sep. 29, 1995

[30] Foreign Application Priority Data

Sep. 30, 1994 [JP] Japan ................................. 6-271909

[51] Int. Cl.$^6$ ........................................................ C08F 8/00
[52] U.S. Cl. .................... 525/340; 525/328.9; 525/344; 525/353; 525/355; 525/386
[58] Field of Search ........................... 525/340, 344, 525/353, 355, 386

[56] References Cited

U.S. PATENT DOCUMENTS 5,110,709  5/1992  Aoai et al. ........................ 522/59
5,346,803  9/1994  Crivello et al. ................... 430/220

FOREIGN PATENT DOCUMENTS 4-211258  8/1992  Japan .

*Primary Examiner*—Bernard Lipman
*Attorney, Agent, or Firm*—Millen, White, Zelano, & Branigan, P.C.

[57] ABSTRACT

A partially tert-butoxylated poly(p-hydroxystyrene) is prepared by subjecting poly(p-tert-butoxystyrene) to reaction of eliminating some of the tert-butoxy groups in an organic solvent at a temperature of 30°–100° C. in the presence of an acid catalyst at a molar ratio of acid catalyst/t-BuO group of from 0.050 to 2.0. During the elimination reaction, a change of solubility of the resulting partially tert-butoxylated poly(p-hydroxystyrene) is determined to calculate a degree of elimination of tert-butoxy groups. The reaction is terminated when a desired degree of elimination is reached. Through a simple process, partially tert-butoxylated poly(p-hydroxystyrene) having a well controlled t-BuO content is produced in high yields.

9 Claims, 2 Drawing Sheets

METHOD FOR PREPARING PARTIALLY TERT-BUTOXYLATED POLY(P-HYDROXYSTYRENE)

BACKGROUND OF THE INVENTION

1. Technical Field

This invention relates to a method for preparing a partially tert-butoxylated poly(p-hydroxystyrene) which is useful as resist materials and various other functional materials.

2. Prior Art

As base polymers for chemically amplified resist materials, Japanese Patent Application Kokai (JP-A) Nos. 45439/1984 and 115440/1987 disclose resins wherein some of the hydroxyl groups of polyhydroxystyrene are replaced by tert-butoxycarbonyloxy groups (abbreviated as t-Boc groups). These resins are thermally unstable, complicated to synthesize, and expensive because an expensive reagent must be used for introducing t-Boc groups.

One solution to this problem is partially tert-butoxylated poly(p-hydroxystyrene) which is a polyhydroxystyrene having some of its hydroxyl groups replaced by tert-butoxy groups (abbreviated as t-BuO groups). According to JP-A 211258/1992, it can be prepared by the following three methods.

A first method is by copolymerizing tert-butoxystyrene with hydroxystyrene to form partially tert-butoxylated poly(p-hydroxystyrene). Since hydroxystyrene is a monomer having high spontaneous polymerization ability, monomer handling and polymerization control are difficult.

A second method is by reacting polyhydroxystyrene with isobutene to introduce t-BuO groups to form partially tert-butoxylated poly(p-hydroxystyrene). The method follows a complex synthesis route involving polymerization of a hydroxystyrene derivative having a protected hydroxyl group, removal of the protective group from the resulting polymer, and introduction of t-BuO groups by addition reaction with isobutene. Since addition of isobutene does not occur in proportion to its charge, it is difficult to introduce a desired amount of t-BuO groups.

A third method is by effecting partial elimination reaction of poly(tert-butoxystyrene) to form partially tert-butoxylated poly(p-hydroxystyrene). It is simply required that some t-BuO groups be eliminated from poly(tert-butoxystyrene), which is synthesized by radical or anionic polymerization of tert-butoxystyrene, in the presence of an acid catalyst. However, since the reaction proceeds in a catalyzed manner, partially tert-butoxylated poly(p-hydroxystyrene) having an amount of t-BuO groups as designed cannot be prepared simply by controlling the amount of the acid catalyst added for reaction. Since a t-BuO group content is one of the important factors governing resist properties such as a dissolving rate in a developer, optimization of a t-BuO group content is very important for the manufacture of high sensitivity, high resolution resists. It is thus necessary to control the t-BuO group content exactly to the design value.

An attempt was made to perform quantitative analysis of a degree of elimination of t-BuO groups during reaction and terminate the reaction when a desired degree of elimination is reached. For the analysis of a degree of elimination, proton-NMR, infrared (IR) absorption spectroscopy and gas chromatography are employed. Although the t-BuO group content of the resulting partially tert-butoxylated poly(p-hydroxystyrene) can be directly determined by proton-NMR and IR spectroscopy, the polymer must be thoroughly purified in order to enable this analysis, taking a substantial time for measurement. This is inadequate for quick observation of a degree of progress of elimination reaction. In the case of gas chromatography, the concentrations of isobutene, tert-butyl alcohol and tert-butyl chloride resulting from elimination reaction are measured, and a t-BuO group content of the resultant partially tert-butoxylated poly(p-hydroxystyrene) is determined from these concentrations. This method allows for quick analysis because of direct measurement of the reaction solution. However, precise measurement with a sufficient degree of reproducibility is difficult because the t-BuO group content of partially tert-butoxylated poly(p-hydroxystyrene) is calculated indirectly from the amounts of the eliminated compounds whose concentration in the reaction solution is very low.

SUMMARY OF THE INVENTION

Therefore, an object of the present invention is to provide a method for preparing partially tert-butoxylated poly(p-hydroxystyrene) having a precisely controlled t-BuO group content in a simple manner and in high yields.

The present invention is directed to a method for preparing a partially tert-butoxylated poly(p-hydroxystyrene) of the following structural formula (1):

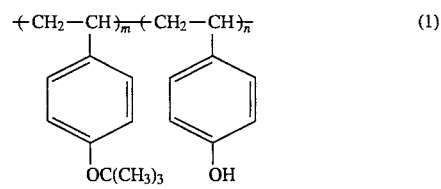

wherein $m/m+n$ is 0.05 to 0.40 and $n/m+n$ is 0.60 to 0.95, by heating poly(p-tert-butoxystyrene) in an organic solvent at a temperature of 30° to 100° C. in the presence of an acid catalyst for effecting the reaction of eliminating some of the t-BuO groups. We have found that by setting the molar ratio of the acid catalyst to the t-BuO group at 0.050:1 to 2.0:1, quantitatively determining a change of solubility of the resulting partially tert-butoxylated poly(p-hydroxystyrene), typically in water, to calculate a degree of elimination of tert-butoxy groups, and terminating the reaction when a desired degree of elimination is reached, there is produced a partially tert-butoxylated poly(p-hydroxystyrene) having a t-BuO group content of 5 to 40 mol % with an error in the range of ±2% relative to the design value.

The term "butoxylated" poly(p-hydroxystyrene) means that poly(p-hydroxystyrene) contains butoxy groups. The t-BuO group content or ratio is given as $m/(m+n)$ in formula (1).

BEST MODE FOR CARRYING OUT THE INVENTION

Figure 1:
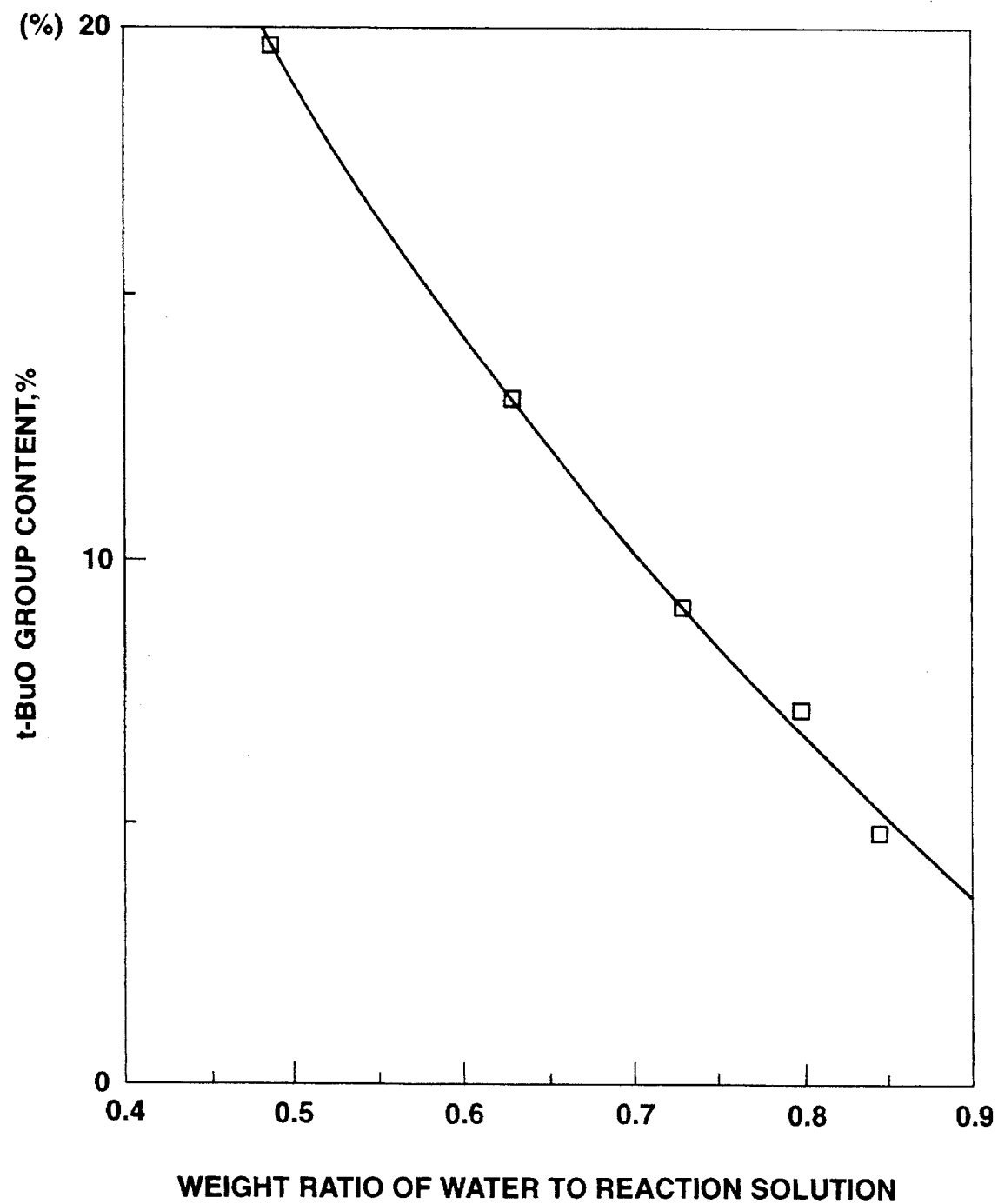
FIG. 1 is a graph showing the t-BuO group content (%) as a function of the weight ratio of water to reaction solution in Example 1.

According to the present invention, a partially tert-butoxylated poly(p-hydroxystyrene) of the following structural formula (1):

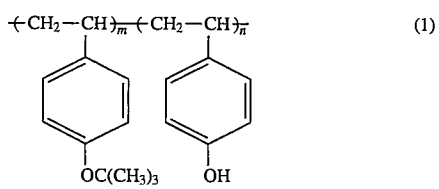

(1)

wherein m/m+n is 0.05 to 0.40 and n/m+n is 0.60 to 0.95 is prepared by subjecting poly(p-tert-butoxystyrene) to reaction for eliminating some of the t-BuO groups in an organic solvent at a certain temperature in the presence of an acid catalyst. The molar ratio of the acid catalyst to the t-BuO group of poly(p-tert-butoxystyrene) ranges from 0.050:1 to 2.0:1. A degree of elimination of t-BuO group is quantitatively determined from a change of solubility of the resulting partially tert-butoxylated poly(p-hydroxystyrene). Then the reaction can be terminated when a desired degree of elimination is reached.

The reaction temperature is in the range of 30° to 100° C., preferably 50° to 60° C. Reaction temperatures above 100° C. increase the reaction rate so much that all the t-BuO groups may be eliminated within a short time, rendering it difficult to control a degree of elimination. Reaction temperatures below 30° C. retard the reaction rate so that a very long time is taken for reaction to produce a polymer having a desired degree of elimination.

The organic solvent used herein is a polar solvent, for example, acetone, 1,4-dioxane, tetrahydrofuran, or methyl isobutyl ketone alone or in admixture of two or more. Acetone is preferred because of high solubility therein of the starting reactant and the product and low cost.

Preferably the initial concentration of poly(p-tert-butoxystyrene) in the organic solvent is about 10 to 20% by weight.

Examples of the acid catalyst include hydrochloric acid, sulfuric acid, phosphoric acid, hydrobromic acid, p-toluenesulfonic acid, acetic acid, and trifluoroacetic acid, with the hydrochloric acid being preferred. The molar ratio of the acid catalyst to the t-BuO group of poly(p-tert-butoxystyrene) ranges from 0.050:1 to 2.0:1, preferably from 0.10:1 to 0.50:1. With an acid catalyst molar ratio of less than 0.050, it is difficult to produce a partially tert-butoxylated poly(p-hydroxystyrene) having a desired degree of elimination since the reaction rate is too slow and the acid catalyst can be deactivated. With an acid catalyst molar ratio of more than 2.0 it is also difficult to control a degree of elimination since the reaction rate is so high that all the t-BuO groups may be eliminated within a short time.

A degree of elimination can be controlled to a more or less extent by properly selecting the above-mentioned reaction conditions although the control is less strict and lacks reproducibility. Especially when it is desired to use the partially tert-butoxylated poly(p-hydroxystyrene) as resist material, a degree of elimination is desirably controlled to an error within ±2% relative to the design value because the t-BuO group content largely affects resist properties such as a dissolving rate in a developer.

The present invention is based on the finding that as the degree of elimination increases, the number of phenolic hydroxyl groups which are hydrophilic groups increases and the solubility of partially tert-butoxylated poly(p-hydroxystyrene) in water changes. By performing quantitative analysis of the degree of elimination during reaction and terminating the reaction when a desired degree of elimination is reached, there can be produced a partially tert-butoxylated poly(p-hydroxystyrene) having a designed t-BuO group content within an error of ±2%.

When water is added to the reaction solution, the phenomenon differs with a degree of elimination. At a low degree of elimination, a precipitate of resin is observed upon addition of a small amount of water. As the degree of elimination increases, a greater amount of water must be added until a resin precipitate is observed. There is a precise correlation between the amount of water added and the t-BuO group content of the resulting resin.

More particularly, the degree of elimination of the reaction solution can be measured by sampling the reaction solution, adding water to the sample, and determining the amount of water required until the sample becomes white turbid due to resin precipitation. Measurement of a degree of elimination is simple and quick. The analysis is precise because the attributes of partially tert-butoxylated poly(p-hydroxystyrene) being produced can be directly examined.

Analysis is continued after elimination reaction is started under the above-mentioned conditions. When the degree of elimination reaches a desired design value, the reaction can be terminated by cooling the reaction system and adding a base such as pyridine, triethyl amine, and aqueous sodium hydroxide. The amount of the base added is preferably at least equal to the amount of the acid catalyst for elimination reaction.

Next, by adding water or the like to the reaction solution for causing a white resin to precipitate, re-precipitating it from an acetone-water system, washing it with water and optionally repeating these work-up steps, the end product, partially tert-butoxylated poly(p-hydroxystyrene) is isolated and purified.

The thus collected partially tert-butoxylated poly(p-hydroxystyrene) has a t-BuO content which is equal to the design value within an error of ±2%. Since no side reactions such as backbone cleavage and crosslinking reaction occur during the elimination reaction, the yield is substantially 100% based on the starting poly(p-tert-butoxystyrene).

The resultant partially tert-butoxylated poly(p-hydroxystyrene) has a degree of polymerization (corresponding to m+n in formula (1)) of about 10 and 600 and a molecular weight distribution (Mw/Mn) which are approximately equal to those of the starting poly(p-tert-butoxystyrene). Analysis of the molecular weight distribution can be done by gel permeation chromatography (GPC). The resultant resin can be determined for molecular structure by proton-NMR and IR spectroscopy and for molecular weight by membrane osmosis and light scattering methods.

According to the present invention, a partially tert-butoxylated poly(p-hydroxystyrene) having a well controlled t-BuO group content which is equal to the design value within an error of ±2% can be produced in high yields by the simple process of partial elimination reaction of poly(p-tert-butoxystyrene) in the presence of an acid catalyst.

EXAMPLE

Examples of the invention are given below by way of illustration and not by way of limitation.

Comparative Example

A 1-liter separable flask was charged with 50.0 g of poly(p-tert-butoxystyrene) and 400 ml of acetone. With thorough stirring, the contents were heated with a hot water bath. After the start of refluxing, 20.7 g of 10 wt % hydrochloric acid, which would give a t-BuO content of 16.0% based on the relationship between the molar ratio of acid catalyst to t-BuO group of poly(p-tert-butoxystyrene) and a t-BuO group content, was added dropwise over 10 to 20 minutes. Refluxing was continued for a further 8 hours. After the reaction solution was allowed to cool, 40 ml of pyridine was added to terminate the reaction. The reaction solution was poured into a large amount of water, precipitating a white resin powder. A partially tert-butoxylated poly(p-hydroxystyrene) was isolated and purified by repeating re-precipitation from an acetone-water system. The yield was substantially quantitative relative to the starting poly(p-tert-butoxystyrene) while the t-BuO group content varied from 10.5 to 21.4% and not reproducible between batches. It was thus difficult to control a t-BuO group content simply by optimizing the amount of acid catalyst added.

Example 1

A 1-liter separable flask was charged with 50.0 g of poly (p-tert-butoxystyrene) and 400 ml of acetone. With thorough stirring, the contents were heated with a hot water bath. After the start of refluxing, 25.9 g of 10 wt % hydrochloric acid, which gave a molar ratio of acid catalyst to t-BuO group of poly(p-tert-butoxystyrene) of 0.25, was added dropwise over 10 to 20 minutes. Refluxing was continued for a further 8 hours. A sample of about 4 ml was taken from the reaction solution at certain intervals. Water was slowly added to the sample to determine the amount of water added until the reaction solution sample became white turbid. FIG. 1 is a graph showing the t-BuO group content (%) as a function of the weight ratio of water to reaction solution.

It was assumed that the design value of t-BuO group content was 16.0%. The same reaction was performed while the reaction solution was sampled out at certain intervals. When the amount of water added to a sample reached the weight ratio of water to reaction solution corresponding to the t-BuO group content of 16.0% in FIG. 1, the reaction solution was removed from the bath and allowed to cool down, and 40 ml of pyridine was added to terminate the reaction. The reaction solution was poured into a large amount of water, precipitating a white resin powder. The resulting partially tert-butoxylated poly(p-hydroxystyrene) had a t-BuO group content of 16.0% which well coincided with the design value.

Example 2

Figure 2:
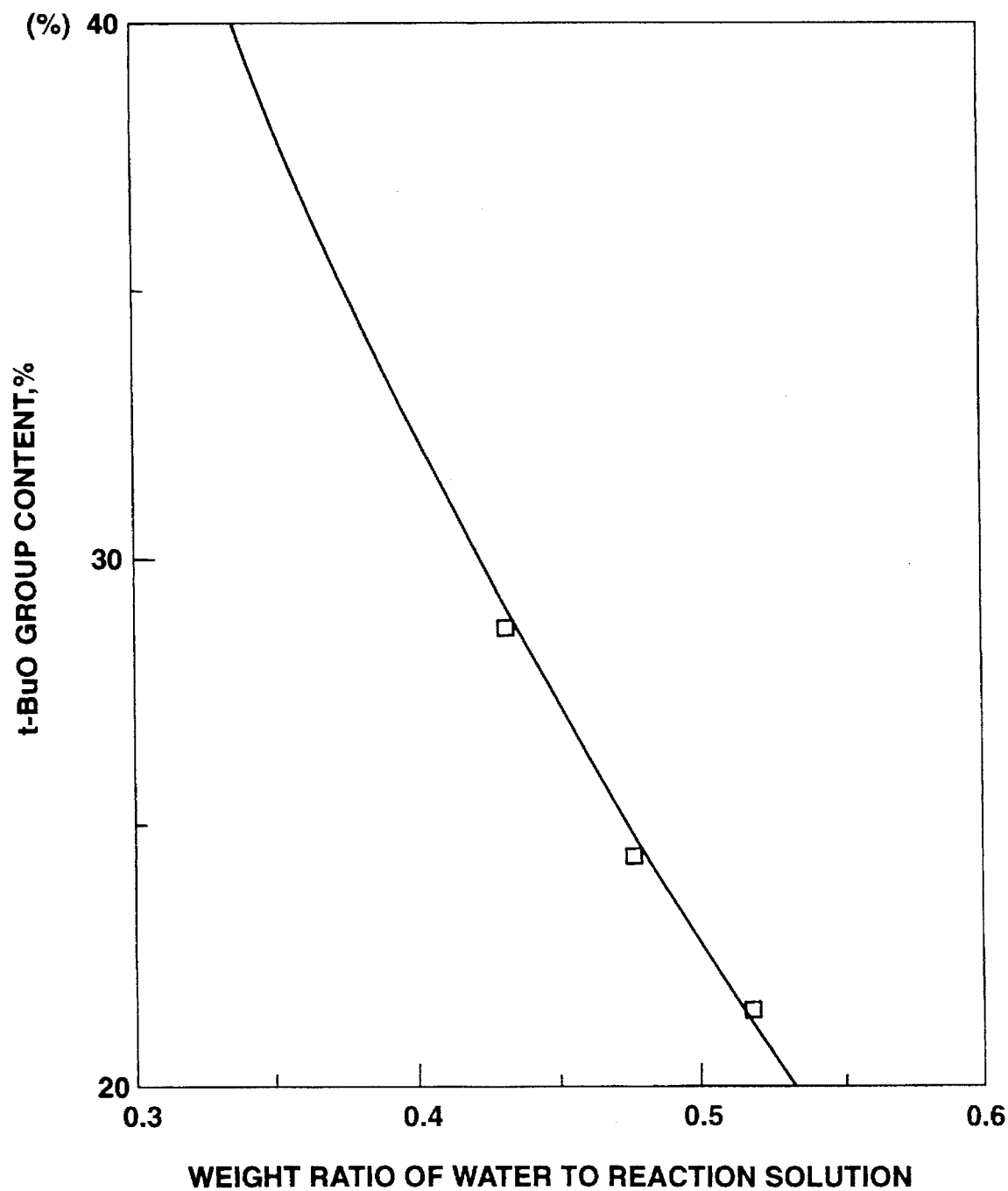
FIG. 2 is a graph showing the t-BuO group content (%) as a function of the weight ratio of water to reaction solution in Example 2.

A 1-liter separable flask was charged with 50.0 g of poly(p-tert-butoxystyrene) and 400 ml of acetone. With thorough stirring, the contents were heated with a hot water bath. After the start of refluxing, 15.6 g of 10 wt % hydrochloric acid, which gave a molar ratio of acid catalyst to t-BuO group of poly(p-tert-butoxystyrene) of 0.15, was added dropwise over 10 to 20 minutes. Refluxing was continued for a further 8 hours. A sample of about 4 ml was taken from the reaction solution at certain intervals. Water was slowly added to the sample to determine the amount of water added until the reaction solution sample became white turbid. FIG. 2 is a graph showing the t-BuO group content (%) as a function of the weight ratio of water to reaction solution.

It was assumed that the design value of t-BuO group content was 28.0%. The same reaction was performed while the reaction solution was sampled out at certain intervals. When the amount of water added to a sample reached the weight ratio of water to reaction solution corresponding to the t-BuO group content of 28.0% in FIG. 2, the reaction solution was removed from the bath and allowed to cool down, and 40 ml of pyridine was added to terminate the reaction. The reaction solution was poured into a large amount of water, precipitating a white resin powder. The resulting partially tert-butoxylated poly(p-hydroxystyrene) had a t-BuO group content of 28.0% which well coincided with the design value.

Japanese Patent Application No. 271909/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a partially tert-butoxylated poly(p-hydroxystyrene) of the following structural formula (1):

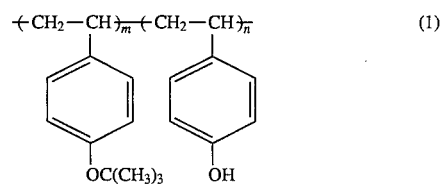

wherein m/m+n is 0.05 to 0.40 and n/m+n is 0.60 to 0.95, comprising the steps of:

heating poly(p-tert-butoxystyrene) in an organic solvent at a temperature of 30° to 100° C. in the presence of an acid catalyst, the molar ratio of the acid catalyst to the tert-butoxy group being 0.050 to 2.0, for effecting reaction of eliminating some of the tert-butoxy groups, quantitatively determining a change of solubility of the resulting partially tert-butoxylated poly(p-hydroxystyrene) to calculate a degree of elimination of tert-butoxy groups, and terminating the reaction when a desired degree of elimination is reached.

2. The method of claim 1, wherein the reaction temperature is 50° to 60° C.

3. The method of claim 1, wherein the organic solvent is a polar solvent.

4. The method of claim 3, wherein the polar solvent is acetone, 1,4-dioxane, tetrahydrofuran, methyl isobutyl ketone or an admixture or two or more thereof.

5. The method of claim 1, wherein the initial concentration of poly(p-tert-butoxystyrene) in the organic solvent is 10 to 20% by weight.

6. The method of claim 1, wherein the acid catalyst is hydrochloric acid, sulfuric acid, phosphoric acid, hydrobromic acid, p-toluenesulfonic acid, acetic acid or trifluoroacetic acid.

7. The method of claim 1, wherein the molar ratio of the acid catalyst to the t-BuO group of the poly(p-tert-butoxystyrene) is from 0.10:1 to 0.50:1.

8. The method of claim 1, wherein the change of solubility is determined by addition of water to a sample of the reaction solution to determine the amount of water necessary to result in resin precipitation.

9. The method of claim 1, wherein the reaction is terminated by cooling and addition of a base.

* * * * *